(12) United States Patent
Ostrand et al.

(10) Patent No.: US 12,148,443 B2
(45) Date of Patent: Nov. 19, 2024

(54) SPEAKER-SPECIFIC VOICE AMPLIFICATION

(71) Applicant: International Business Machines Corporation, Armonk, NY (US)

(72) Inventors: Rachel Ostrand, Milford, PA (US); Sundar Saranathan, Framingham, MA (US); Fang Lu, Billerica, MA (US); Carla Paola Agurto Rios, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 17/126,261

(22) Filed: Dec. 18, 2020

(65) Prior Publication Data

US 2022/0199102 A1   Jun. 23, 2022

(51) Int. Cl.
*G10L 21/0324*    (2013.01)
*G06F 3/16*    (2006.01)
(Continued)

(52) U.S. Cl.
CPC .......... *G10L 21/0324* (2013.01); *G06F 3/165* (2013.01); *G10L 25/84* (2013.01); *H04L 65/401* (2022.05)

(58) Field of Classification Search
CPC . G10L 21/0324; G10L 25/84; G10L 21/0208; G06F 3/165; H04L 65/401
See application file for complete search history.

(56) References Cited

U.S. PATENT DOCUMENTS 7,072,834 B2 * 7/2006 Zhou .................... G10L 15/065
704/E15.01
8,218,751 B2   7/2012 Hepworth et al.
(Continued)

FOREIGN PATENT DOCUMENTS

CN       104485108 A    4/2015
CN       109427340 A    3/2019
(Continued)

OTHER PUBLICATIONS

Sak, Haim, et al. "Fast and accurate recurrent neural network acoustic models for speech recognition." (2015). (Year: 2015).*
(Continued)

*Primary Examiner* — Bhavesh M Mehta
*Assistant Examiner* — Nandini Subramani
(74) *Attorney, Agent, or Firm* — Daniel M. Yeates (57) ABSTRACT

A method, system and computer program product for amplifying a single voice during an audio conversation. One embodiment of the method may comprise receiving, by a computing device, an audio sample of speech from a user, and generating, by the computing device, a user-specific acoustic model for enhancement of speech by the user based upon the audio sample. The method may further comprise receiving a live audiovisual stream, the live audiovisual stream including live speech by the user during an audio conversation, wherein the live audiovisual stream includes background noise, and using, by the computing device, the user-specific acoustic model to selectively amplify the live speech during the live audiovisual stream without amplifying the background noise.

19 Claims, 7 Drawing Sheets

(51) Int. Cl.
*G10L 25/84* (2013.01)
*H04L 65/401* (2022.01)

(56) References Cited

U.S. PATENT DOCUMENTS

| | | | | |
|---|---|---|---|---|
| 9,106,794 | B2* | 8/2015 | Jones | H04M 3/42221 |
| 9,173,028 | B2 | 10/2015 | Marquis et al. | |
| 9,633,671 | B2 | 4/2017 | Giacobello et al. | |
| 9,912,907 | B2 | 3/2018 | De Magalhaes | |
| 10,410,637 | B2* | 9/2019 | Paulik | G10L 15/30 |
| 10,573,321 | B1 | 2/2020 | Smith et al. | |
| 10,678,501 | B2 | 6/2020 | Abuelsaad et al. | |
| 11,374,976 | B2* | 6/2022 | Lillie | G06Q 20/40145 |
| 11,455,984 | B1* | 9/2022 | Haslam | G10L 15/07 |
| 2008/0059163 | A1 | 3/2008 | Ding | |
| 2010/0080374 | A1 | 4/2010 | Hepworth et al. | |
| 2010/0131262 | A1* | 5/2010 | Gruhn | G10L 15/187 |
| | | | | 704/E15.001 |
| 2011/0066433 | A1* | 3/2011 | Ljolje | G10L 15/32 |
| | | | | 704/E15.04 |
| 2012/0022864 | A1 | 1/2012 | Leman et al. | |
| 2013/0185065 | A1 | 7/2013 | Tzirkel-Hancock | |
| 2015/0058003 | A1 | 2/2015 | Mohideen et al. | |
| 2016/0232914 | A1* | 8/2016 | Liang | G10L 21/0208 |
| 2018/0285059 | A1* | 10/2018 | Zurek | G06F 40/35 |
| 2019/0371311 | A1* | 12/2019 | Patel | G06F 3/167 |
| 2020/0280812 | A1 | 9/2020 | Boss et al. | |
| 2020/0349950 | A1* | 11/2020 | Yoshioka | H04L 12/1831 |
| 2021/0056976 | A1* | 2/2021 | Brown | G06F 16/683 |

FOREIGN PATENT DOCUMENTS

| | | |
|---|---|---|
| CN | 110808048 A | 2/2020 |
| CN | 111524527 A | 8/2020 |
| CN | 111653288 A | 9/2020 |
| WO | 2022127485 A1 | 6/2022 |

OTHER PUBLICATIONS

PCT/CN2021/131104 International Search Report and Written Opinion, mailed Jan. 27, 2022.

Creating a custom acoustic model, IBM Cloud Docs / Speech to Text, 10 pages, downloaded from: https://cloud.ibm.com/docs/speech-to-text?topic=speech-to-text-acoustic.

Adobe Connect 8, Manage audio within meetings, 4 pages, downloaded at: https://help.adobe.com/en_US/connect/8.0/using/WS1f8fbc3f2a6aefb9-2b0fcc5112f01e0192f-8000.html.

SM10—Headset Microphone, Shure Products, 5 pages, downloaded from: https://www.shure.com/en-US/products/microphones/sm10.

Schwoebel, J., "An Introduction to Voice Computing in Phython", 408 pages, 2018.

Shankar, "Dual Microphone Speech Enhancement Algorithms on Android-Based Devices for Hearing Study", 59 pages, 2018.

Liu, F., "Audio Fingerprinting for Speech Reconstruction and Recognition in Noisy Environments", 85 pages, 2017.

Ramesh, "Speech Enhancement in Hands-Free Device (Hearing Aid) with emphasis on Elko's", 73 pages, Blekinge Institute of Technology, Apr. 2012.

Authors et. al.: Disclosed Anonymously, "Enhanced call quality using user-specific voiceprint model", IP.com No. IPCOM000257360D, 10 pages, Feb. 5, 2019.

Authors et. al.: Disclosed Anonymously, "Adaptive audio adjustment tone modulation in Cognitive Robots", IP.com No. IPCOM000255040D, 6 oages, Aug. 28, 2018.

Mell, P. et al., "The NIST Definition of Cloud Computing", Recommendations of the National Institute of Standards and Technology, NIST Special Publication 800-145, 7 pages, Sep. 2011.

\* cited by examiner

SPEAKER-SPECIFIC VOICE AMPLIFICATION

BACKGROUND

The present disclosure relates to digital signal processing, and more specifically, to a speaker-specific system and method for amplifying voices.

The development of the EDVAC system in 1948 is often cited as the beginning of the computer era. Since that time, computer systems have evolved into extremely complicated devices. Modern computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One application of these new capabilities is the mobile telephone. Today, people routinely make telephone calls in public spaces (e.g., a cafe or on a train), or may be working remotely. In these environments, background noise from children, spouses, pets, construction, and many other factors may interfere with the conversations.

SUMMARY

According to embodiments of the present disclosure, a method of using a computing device to amplify a single voice during an audio conversation. One embodiment of the method may comprise receiving, by a computing device, an audio sample of speech from a user, and generating, by the computing device, a user-specific acoustic model for enhancement of speech by the user based upon the audio sample. The method may further comprise receiving a live audiovisual stream, the live audiovisual stream including live speech by the user during an audio conversation, wherein the live audiovisual stream includes background noise, and using, by the computing device, the user-specific acoustic model to selectively amplify the live speech during the live audiovisual stream without amplifying the background noise.

According to embodiments of the present disclosure, a computer program product for selectively amplifying a user's voice using a per-trained acoustic model. One embodiment of the computer program product may comprise a computer readable storage medium having program instructions embodied therewith. The program instructions may be executable by a processor to cause the processor extract voice data for a user from an existing voice sample, create a pre-trained acoustic model for the user from the voice data, analyze an audio stream from a conference call, detect a presence of background noise in the audio stream, and apply the pre-trained acoustic model to the audio stream to selectively amplify the user's voice and not the background noise.

According to embodiments of the present disclosure, a computer system for amplifying a single voice during an audio conversation. One embodiment of the system may comprise a processor configured to execute program instructions that, when executed on the processor, cause the processor to receive an audio sample of speech from a user, generate a user-specific acoustic model for enhancement of speech by the user based upon the audio sample; receive a live audiovisual stream, the live audiovisual stream including live speech by the user during an audio conversation, wherein the live audiovisual stream includes background noise, and use the user-specific acoustic model to selectively amplify the live speech during the live audiovisual stream without amplifying the background noise.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to digital signal processing; more particular aspects relate to a speaker-specific system and method for amplifying voices. While the present disclosure is not necessarily limited to such applications, various aspects of the disclosure may be appreciated through a discussion of various examples using this context.

Some embodiments of the disclosure may include a system that builds a speaker-specific acoustic model of a user from a recording. Some embodiments may then use the speaker-specific acoustic model to isolate the user's voice in future live audio and/or audiovisual streams, such that these embodiments can boost a volume of only that portion of the signal containing the user's spoken content and/or can reduce a volume noise from unwanted (e.g., background) sources. That is, some embodiments may: (a) reduce/remove unwanted background noise; and (b) enhance the speaker's own voice. The background noise, in turn, may include relatively static sounds generated by the conferencing system itself (e.g., static recorded and/or generated by the user's microphone, artifacts generated during digital compression or transmission of the microphone's output, etc.), relatively static sounds generated by environmental sources (e.g., local HVAC equipment, car engine and tire sounds, airplane engine sounds, etc.), dynamic sounds (e.g., other people speaking nearby, sounds generated by nearby construction equipment and processes, dog barking, ambulance sirens, etc.), and other sounds that are not speaker's own voice.

In operation, the user may begin by recording their voice in a quiet environment (i.e., substantially without background noise), creating clean target recording or set of recordings. Some embodiments may then analyze the clean recordings to generate one or more parameters for a voice profile. Some embodiments may then build the speaker-specific acoustic model of the user's voice using the one or more parameters. This speaker-specific acoustic model may be specifically tuned to that particular user's vocal characteristics (i.e., each user may have a different, or even unique, acoustic model associated with them). In this way, the speaker-specific acoustic model may be adapted for characteristics of that particular user's voice and speech patterns, such as its pitch and frequency range.

Once the acoustic model is built and/or trained, the same features for creating the models may be extracted and processed from the future live audio and/or audiovisual streams. If no modification to those streams are required, the original input may be sent to a network platform; otherwise the disclosed system may improve the signal and send it to the platform (and/or other participants in a conference call) in near real time (e.g., less than 100 ms). This process may include measuring levels of background noise and attenuating that noise to acceptable levels (e.g., similar to those found during the initial training). The model in these embodiments may look and analyze different voice patterns associated to the speaker-specific characteristics of a user specified at the initial training.

Some embodiments may detect when the user joins a conference call by analyzing the user's interaction with their associated electronic devices, which could be a computer or a telephone containing a microphone. Some embodiments may also determine that the user is currently presenting by comparing the user's name with the agenda or by detecting the content of the current speech, and may selectively amplify that user's voice while depressing background noises and other participants' voices.

In response to the detection, some embodiments may apply a dynamic band-pass or band-stop filter to selectively amplify certain frequencies and/or selectively suppress certain frequencies when transmitting and/or retransmitting the audio stream. This suppression and/or amplification may occur in the time domain and/or the frequency domain in some embodiments. In this way, the user's voice signal may be effectively boosted while being transmitted and/or retransmitted, and any other noises (other voices, non-speech sounds) may be depressed and/or not transmitted/retransmitted.

Additionally, some embodiments may detect that there is some environmental noise (e.g., car horns), or that other people are speaking in the background at the same time (e.g., children). The system may then identify the detected background noise and/or detected other peoples' voices as unwanted signals and remove them from the transmitted/retransmitted stream. More specifically, some embodiments may automatically activate and deactivate the pre-trained acoustic model associated with the presenter to boost the presenter's voice when the presenter speaks. Additionally, some embodiments automatically selectively modify the pre-trained acoustic model to compensate for the detected noise and/or voices. In this way, the other meeting participants can hear the presenter more clearly and without interference. Some embodiments may be also configured with a configurable threshold for what will be detected as unwanted background noise—such as a threshold based on length of time, or loudness, or amount of deviation from the pre-trained user's pitch range, etc. In this way, users and applications that require acoustic fidelity may decrease the amount and/or degree of filtering performed by some embodiments.

The acoustic model in some embodiments may be based on the acoustic voiceprint (profile) of a user. These features may include, without limitation: pitch variations and perturbations (e.g., jitter), periodicity measurements (e.g., harmonic-noise ratio), linear predictive coding coefficients (LPCs), spectral shape measurements, voice onset time, Mel Frequency Cepstral Coefficients (MFCCs), i-vectors, etc. The model may be trained on the user's voice-print, which is speaker-specific, at the beginning with the user's approval. The acoustic model in some embodiments may include unsupervised voice alignment algorithms, Hidden Markov models, removal of unwanted noise algorithms, phoneme-token DNN, etc. Some of these features (e.g., formants: F1 and F2) may be primarily used to characterize (e.g., obtain the fingerprint of) the uniqueness of the user's voice, while other of these features (e.g., harmonics to noise ratio) may be primarily used to characterize the background noise.

In some embodiments, the acoustic features that may be analyzed to build a speaker-specific voice profile include, without limitation, one or more features selected from the group consisting of fundamental frequency, spectral envelope, pitch characteristics (e.g., average, maximum, minimum, etc.), voice onset time (VOT) of various consonants, F1 and F2 to characterize vowel pronunciation, and vowel duration. These acoustic features may be used to distinguish one user's voice from other human voices (particularly the consonant and vowel features above) and from non-speech sounds (particularly the higher-level pitch and frequency features above).

Some embodiments may also create supplemental acoustic models for a user for when their voice is somewhat different, such as when they have congestion or a sore throat. Similarly, some embodiments may also create customized, speaker-specific acoustic models for each language that the user speaks, as different languages may have different phonological profiles, even for the same speaker.

As a first illustrative example, assume a user ("A") is working remotely. As a result, user A is at home much of the time with her husband, children, and pets, who may all make noise in the background while she is trying to take business calls. In particular, when user A calls into a meeting, her dog may often be heard barking in the background. In this example, an acoustic model has been previously trained on user A's voice and has a specific acoustic profile customized for her voice and speech patterns. Accordingly, the system in this example may detects user A's voice, and then may selectively amplify only her voice, while simultaneously reducing any noise from her dog from being broadcast to the other meeting participants.

As a second illustrative example, a user ("B") is running late to a meeting. User B takes a conference call in her car. As a result, there is a lot of background noise from the road, the car engine, and maybe even her crying baby in the backseat. Traditionally, user B could partially mitigate this noise by placing herself on mute, but then could not fully participate in that meeting without distracting her co-workers with all of the extraneous noise. Using some embodiments of the disclosure, however, a speaker specific acoustic model may have been pre-trained on user B's voice. Now, when she calls in from her car, some embodiments may identify and boost various acoustic properties that are specific to user B's voice, while reducing the acoustic properties that are not consistent with her voice (e.g., from the road, her car, etc.) Thus, user B is able to speak in her meeting without also transmitting loud noises from her environment.

As a third illustrative example, a user ("C") has a mild cold and, as a result, is working remotely out of consideration to her coworkers. While User C calls into meetings, user C occasionally coughs and sneezes. Using some embodiments, an acoustic model may have been pre-trained on user C's normal voice, e.g., without the coughs and sneezes, and so, may selectively boost the signal of her speech, while selectively removing the coughs and sneezes as unwanted background noise. Additionally, knowing she is likely to cough or sneeze during the meeting, the user C may configure the threshold for what counts as unwanted background noise in some embodiments—either based on length of time, or loudness, or amount of deviation from the pre-trained user's pitch range, etc. to ensure that those coughs are filtered.

As a fourth illustrative example, a user ("D") is sick with a sore throat and is working remotely to prevent the spread of this infection to his coworkers. As a result of the infection, however, user D's voice currently sounds different than his normal voice. Some embodiments of the disclosure may allow user D to create an additional customized acoustic model (or adjust his associated acoustic models) of the user's voice (e.g., both their "normal" speech as well as their current, "abnormal" voice, for example, due to illness). User D may thus choose to train another version of the system for his sore throat voice such that, when he calls into meetings, the system is able to recognize and boost his current voice, as opposed to suppressing it as background noise, even though it has some different acoustic properties from his normal voice. Additionally, some embodiments may selectively modify those acoustic properties so that user D's current voice sounds more like his normal voice, as presented to the other conference participants.

Accordingly, one feature and advantage of some embodiments is that they may not require the user to have and use specific hardware, such as directional microphones, to amplify their voice and/or to suppress noise. As a result, some embodiments may be integrated as a plugin into existing video-conference system and phone microphone processing software. Another feature and advantage of some embodiments is that they may selectively amplify a user's voice using a pre-trained acoustic model. In this way, some embodiments may continue to broadcast a greater dynamic range of sounds, including desired, but unexpected, noises. Another feature and advantage of some embodiments is that they may learn that user's vocal characteristics, and selectively boost the signal on that basis. In this way, some embodiments may allow for noise reduction even if the user is moving around within their local physical environment, may also allow more than one speaker to use a microphone at a time, and/or may allow more than one speaker to speak at a time.

Data Processing System

Figure 1:
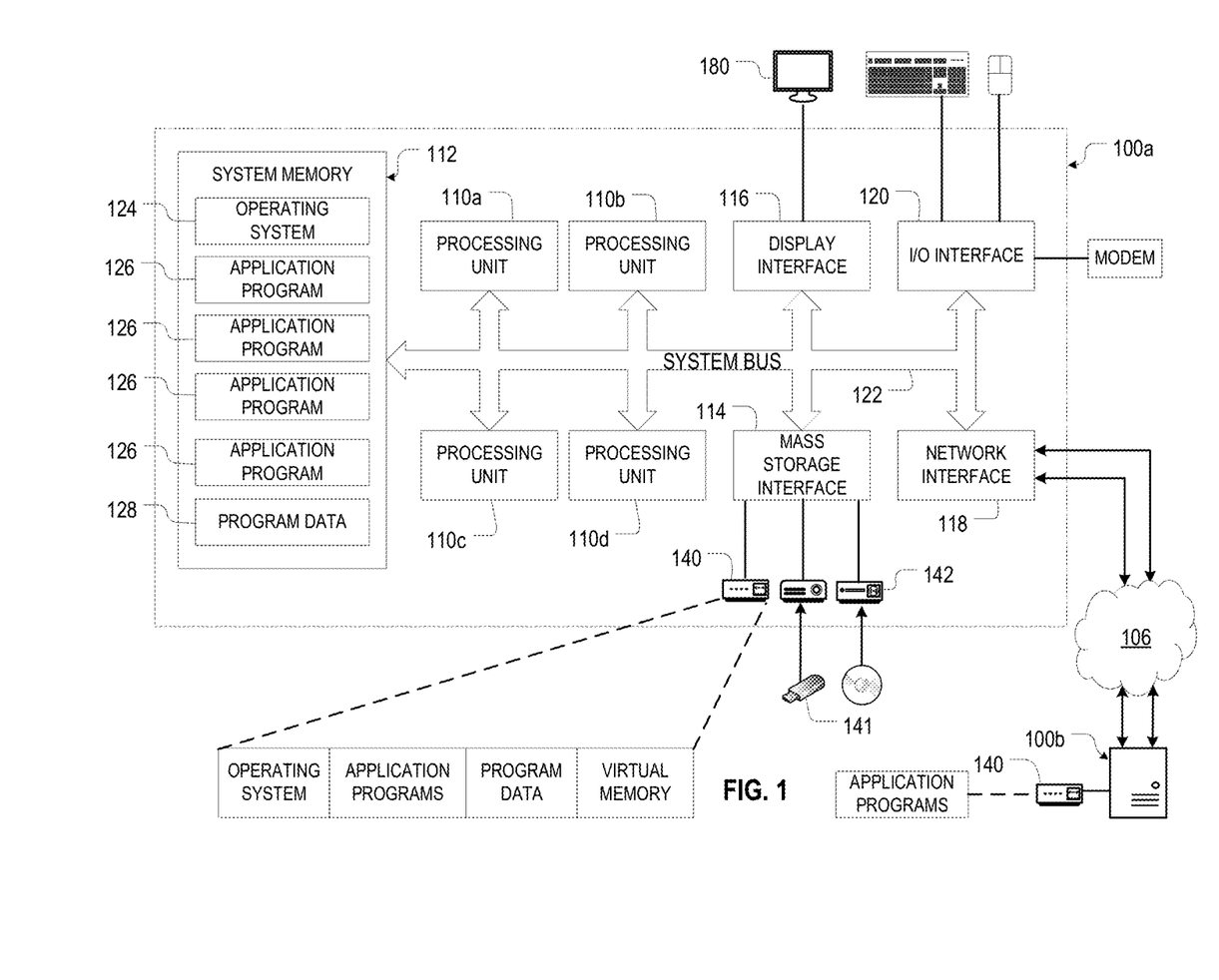
FIG. 1 illustrates an embodiment of a data processing system (DPS), consistent with some embodiments.

FIG. 1 illustrates an embodiment of a data processing system (DPS) 100a, consistent with some embodiments. The DPS 100a in this embodiment may be implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary. Moreover, FIG. 1 only depicts the representative major components of the DPS 100a, and individual components may have greater complexity than represented in FIG. 1.

The data processing system 100a in FIG. 1 comprises a plurality of central processing units 110 a-110 d (herein generically referred to as a processor 110 or a CPU 110) connected to a memory 112, a mass storage interface 114, a terminal/display interface 116, a network interface 118, and an input/output ("I/O") interface 120 by a system bus 122. The mass storage interface 114 in this embodiment connect the system bus 122 to one or more mass storage devices, such as a direct access storage device 140, universal serial bus ("USB") storage device 141, or a readable/writable optical disk drive 142. The network interfaces 118 allow the DPS 100a to communicate with other DPS 100b over the communications medium 106. The memory 112 also contains an operating system 124, a plurality of application programs 126, and program data 128.

The data processing system 100a embodiment in FIG. 1 is a general-purpose computing device. Accordingly, the processors 110 may be any device capable of executing program instructions stored in the memory 112 and may themselves be constructed from one or more microprocessors and/or integrated circuits. In this embodiment, the DPS 100a contains multiple processors and/or processing cores, as is typical of larger, more capable computer systems; however, in other embodiments the data processing system 100a may comprise a single processor system and/or a single processor designed to emulate a multiprocessor system. Further, the processors 110 may be implemented using a number of heterogeneous data processing systems 100a in which a main processor is present with secondary processors on a single chip. As another illustrative example, the processor 110 may be a symmetric multi-processor system containing multiple processors of the same type.

When the data processing system 100a starts up, the associated processor(s) 110 initially execute the program instructions that make up the operating system 124, which manages the physical and logical resources of the DPS 100a. These resources include the memory 112, the mass storage interface 114, the terminal/display interface 116, the network interface 118, and the system bus 122. As with the processor(s) 110, some DPS 100a embodiments may utilize multiple system interfaces 114, 116, 118, 120, and busses 122, which in turn, may each include their own separate, fully programmed microprocessors.

Instructions for the operating system, applications and/or programs (generically referred to as "program code," "computer usable program code," or "computer readable program code") may be initially located in the mass storage devices 140, 141, 142, which are in communication with the processors 110 through the system bus 122. The program code in the different embodiments may be embodied on different physical or tangible computer readable media, such as the system memory 112 or the mass storage devices 140, 141, 142. In the illustrative example in FIG. 1, the instructions are stored in a functional form of persistent storage on the direct access storage device 140. These instructions are then loaded into the memory 112 for execution by the processor 110. However, the program code may also be located in a functional form on the computer readable media that is selectively removable and may be loaded onto or transferred to the DPS 100a for execution by the processor 110.

The system bus 122 may be any device that facilitates communication between and among the processors 110; the memory 112; and the interfaces 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The memory 112 and the mass storage devices 140, 141, 142 work cooperatively to store the operating system 124, the application programs 126, and the program data 128. In this embodiment, the memory 112 is a random-access semiconductor device capable of storing data and programs. Although FIG. 1 conceptually depicts that device as a single monolithic entity, the memory 112 in some embodiments may be a more complex arrangement, such as a hierarchy of caches and other memory devices. For example, the memory 112 may exist in multiple levels of caches, and these caches may be further divided by function, so that one cache holds instructions while another holds non-instruction data, which is used by the processor or processors. Memory 112 may be further distributed and associated with different processors 110 or sets of processors 110, as is known in any of various so-called non-uniform memory access (NUMA) computer architectures. Moreover, some embodiments may utilize virtual addressing mechanisms that allow the DPS 100a to behave as if it has access to a large, single storage entity instead of access to multiple, smaller storage entities such as the memory 112 and the mass storage device 140, 141, 142.

Although the operating system 124, the application programs 126, and the program data 128 are illustrated as being contained within the memory 112, some or all of them may be physically located on different computer systems and may be accessed remotely, e.g., via the communications medium 106, in some embodiments. Thus, while the operating system 124, the application programs 126, and the program data 128 are illustrated as being contained within the memory 112, these elements are not necessarily all completely contained in the same physical device at the same time and may even reside in the virtual memory of other DPS, such as DPS 100b.

The system interfaces 114, 116, 118, 120 support communication with a variety of storage and I/O devices. The mass storage interface 114 supports the attachment of one or more mass storage devices 140, 141, 142, which are typically rotating magnetic disk drive storage devices, a solid-state storage device (SSD) that uses integrated circuit assemblies as memory to store data persistently, typically using flash memory, or a combination of the two. However, the mass storage devices 140, 141, 142 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 116 is used to directly connect one or more display units 180, which may include monitors or the like, to the data processing system 100a. These display units 180 may be non-intelligent (i.e., dumb) terminals, such as an LED monitor, or may themselves be fully programmable workstations used to allow IT administrators and customers to communicate with the DPS 100a.

Note, however, that while the display interface 116 is provided to support communication with one or more display units 180, the data processing system 100a does not necessarily require a display unit 180 because all needed interaction with customers and other processes may occur via network interface 118.

The communications medium 106 may be any suitable network or combination of networks and may support any appropriate protocol suitable for communication of data and/or code to/from multiple DPS 100a, 100b. Accordingly, the network interfaces 118 can be any device that facilitates such communication, regardless of whether the network connection is made using present day analog and/or digital techniques or via some networking mechanism of the future. Suitable communications medium 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 106. The Transmission Control Protocol/Internet Protocol ("TCP/IP") suite contains suitable network and transport protocols.

Cloud Computing

Figure 2:
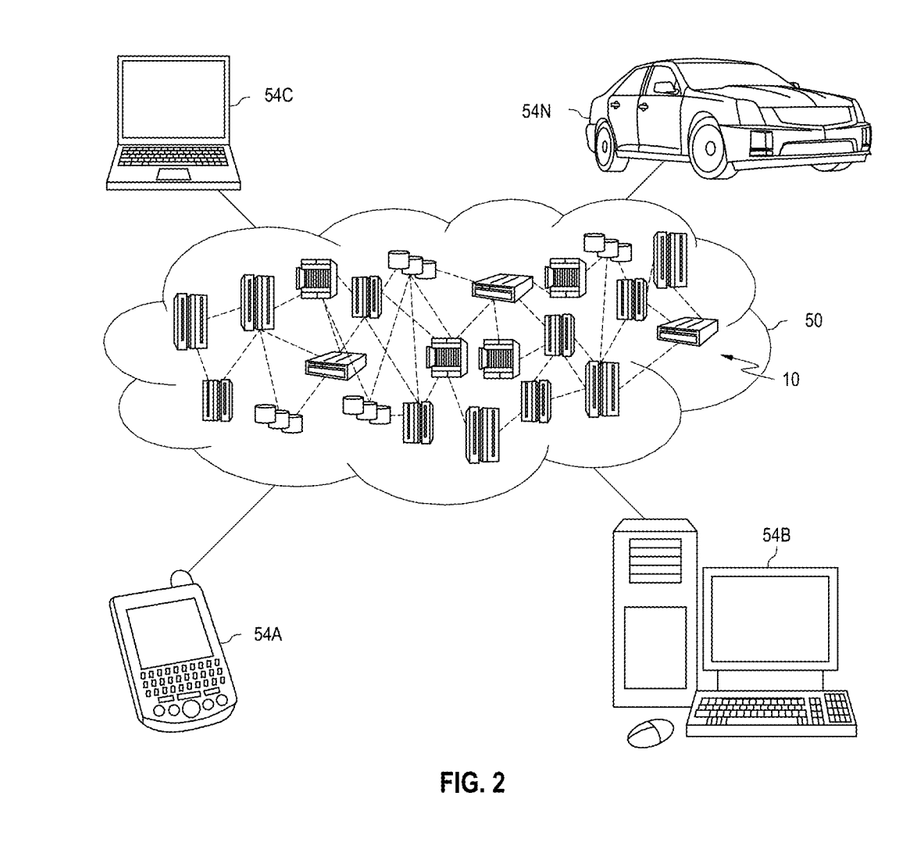
FIG. 2 depicts a cloud computing environment, consistent with some embodiments.

FIG. 2 illustrates a cloud environment containing one or more DPS 100a, 100b consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active customer accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited customer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
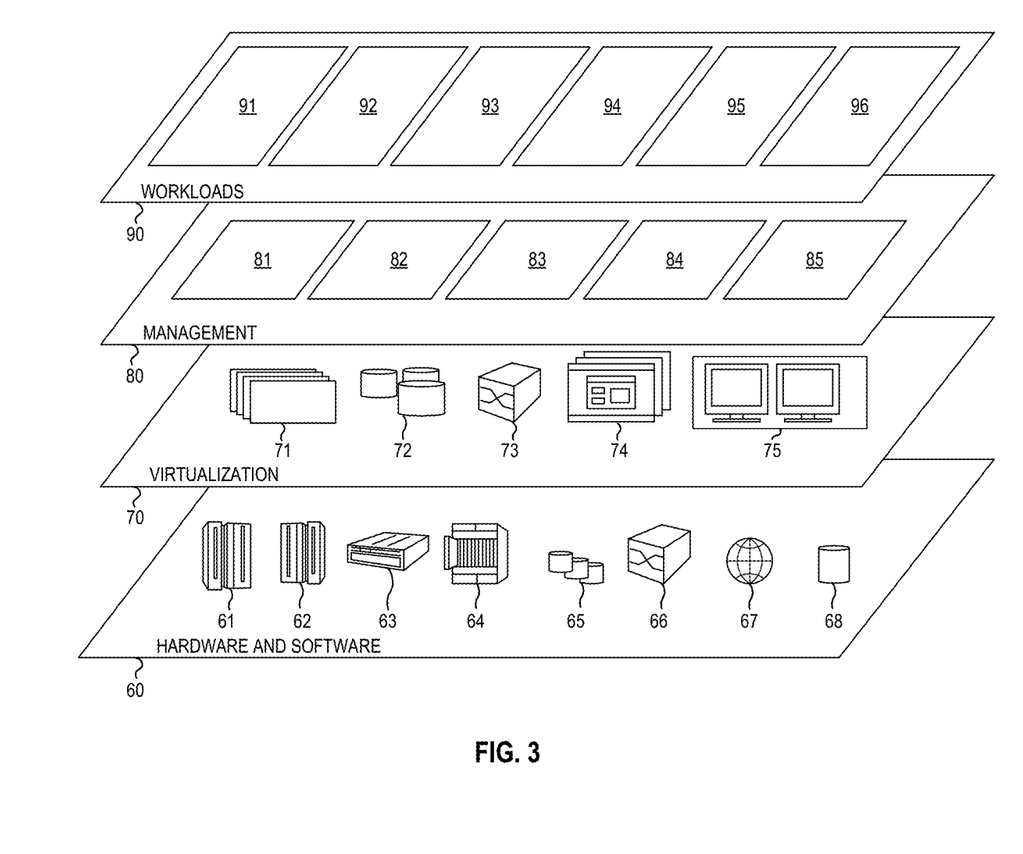
FIG. 3 depicts abstraction model layers, consistent with some embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Customer portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a noise reduction service 96.

Acoustic Platform

Figure 4:
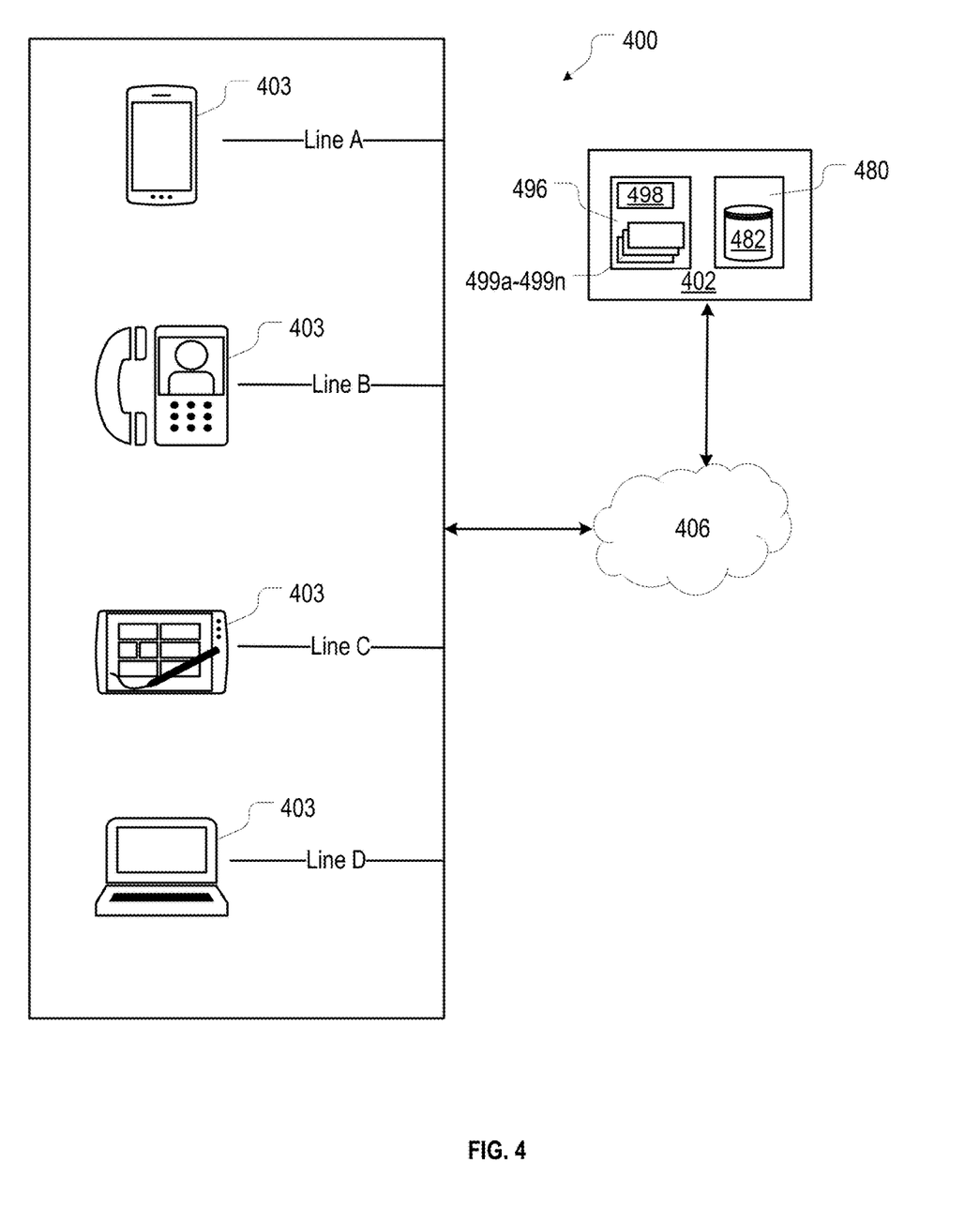
FIG. 4 is a system diagram for a computing environment, consistent with some embodiments.

FIG. 4 is a system diagram of a computing environment 400, consistent with some embodiments. The computing environment 400 may include a conferencing computer platform 402 connected to a plurality of user devices 403 over a network 406. The conferencing computer platform 402, in turn, may comprise a conferencing module 480 and a noise reduction service 496. The noise reduction service 496 may include a trained machine learning model 498 that generates a plurality of customized acoustic profiles 499, one or more for each user of the conferencing computer platform 402. The conferencing module 480 in some embodiments may include a database 482 containing the plurality of customized acoustic profiles.

The conferencing computer platform 402 may be a stand-alone computing device, a management server, a web server, a mobile computing device, or any other electronic device or computing system capable of receiving, sending, and processing data. In some embodiments, the conferencing computer platform 402 may be part of a cloud computing environment 50 and represent a pool of computing resources within that environment. The conferencing computer platform 402 may include internal and external hardware components, as depicted and described in further detail with reference to DPS 100 in FIG. 1.

The user devices 403 may represent one or more programmable electronic devices, or combination of programmable electronic devices, capable of executing machine readable program instructions and communicating with other computing devices (not shown) within computing environment 400 via the network 406. Suitable user devices 403 include, without limitation: a desktop computer, a laptop computer, a tablet computer, a smartphone, a smart watch, and a voice grade telephone handset.

In some embodiments, user devices 403 may include one or more voice over internet protocol (VoIP) compatible devices (i.e., Voice over IP, IP telephony, broadband telephony, and broadband phone service). VoIP generally refers to a methodology and group of technologies for the delivery of voice communications and multimedia sessions over internet protocol (IP) networks, such as the Internet. VoIP may be integrated into smart phones, personal computers, and any general computing devices, such as user devices 403, which are capable of communication with network 406. In some embodiments, the user devices 403 may include one or more speakerphones adapted for use in an audio or video conference environment. A speakerphone generally refers to an audio device that includes at least a loudspeaker, a microphone, and one or more microprocessors.

In some embodiments, the user devices 403 may include a user interface (not independently shown on FIG. 1). This user interface may provide an interface between a user device 403 and the conferencing computer platform. In some embodiments, the user interface may be a graphical user interface (GUI) or a web user interface (WUI) that can display text, documents, web browser windows, user options, application interfaces, and instructions for operation, and include the information (such as graphic, text, and sound) that a program presents to a user and the control sequences the user employs to control the program. In another embodiment, the user interface may include mobile application software that provides an interface between each user device 403 and the conferencing computer platform 402. Mobile application software, or "apps," are a class of computer program that typically run on smart phones, tablet computers, smart watches and other mobile devices.

The network 406 in FIG. 4 may comprise, for example, a public switched telephone network (PSTN), a local area network (LAN), a wide area network (WAN) such as the Internet, or a combination thereof, and may include wired, wireless, or fiber optic connections. The network 406 may utilize a combination of connections and protocols that support communications between the conferencing computer platform 402 and the user devices 403, such as the receipt and transmission data, voice, and/or video signals, including multimedia signals that include voice, data, and video information.

Figure 5:
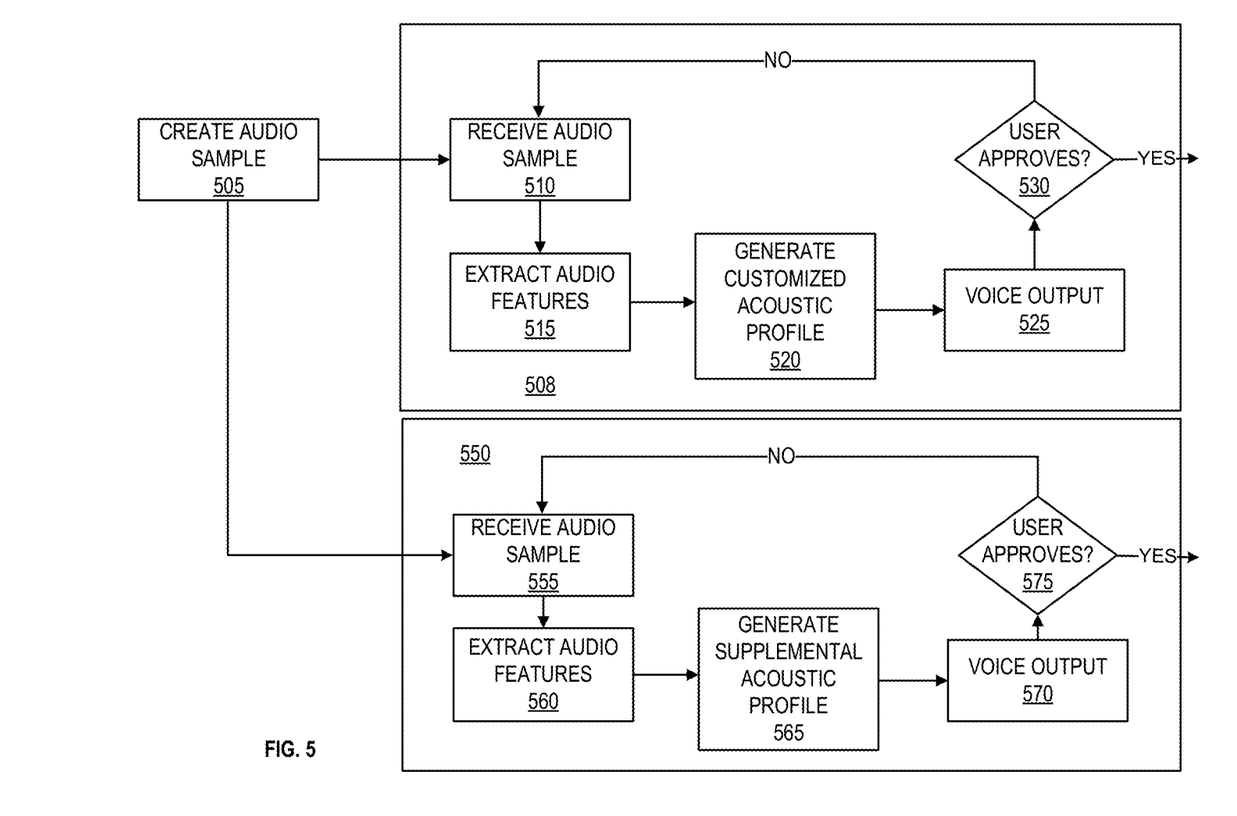
FIG. 5 is a flow chart of a noise reduction service in operation, consistent with some embodiments.

The conferencing computer platform may provide a noise reduction service 496 in some embodiments. FIG. 5 is a flow chart of the noise reduction service 496 in operation, consistent with some embodiments. At operation 505, the user may create an audio sample (e.g., a recording). In some embodiments, the user may be asked to read a predetermined script in a quiet environment using a high-quality microphone. The script may be selected so as to contain a large number of unique audio features, such as the most common and/or all phonemes of a given language. This audio sample may then be used as part of a training phase 508.

In the training phase 508, the noise reduction service 496 may receive the audio sample at operation 510. In response, the noise reduction service 496 may extract the audio features from the audio sample and then feed those features into the trained machine learning model 498 at operation 515. Next, the machine learning model 498 may generate a first customized acoustic profile 499a for the user from the features at operation 520. This acoustic profile 499a may be optimized to selectively identify and/or isolate a full dynamic range of the user's voice from a recording steam. At operations 525-530, the user may optionally be given an opportunity to hear the recording (created at operation 505) as processed by the customized acoustic profile 499a, and then approve or reject the model. If the user rejects the customized acoustic profile 499a (530:NO), the noise reduction service 496 may return to operations 505, 510 to collect and process a new sample. If the user accepts the customized acoustic profile 499a (530:YES), the system may output the model for use in future, live conferences.

Later, the user and/or the noise reduction service 496 may initiate an additional training phase 550. This additional training may allow for creation of additional, supplemental acoustic profile(s) 499b-499n for the user. These supplemental profiles may be created to in response to the user's current physical condition e.g., a cold or sore throat, or may optimize acoustic profile for an alternate language. For example, a user may have one profile 499a of their normal voice when speaking English, one profile 499b of their cough-voice when speaking English, one profile 499c of their normal voice when speaking Spanish, and one profile 499d for use on a particular day when they are sick. In this illustrative example, the user has four separate acoustic profiles 499 stored in the system and may choose one at the start of the conference call.

Like in the initial training phase 508, the adjustment phase begins by receiving a user submitted new audio sample at 555. In response, the noise reduction service 496 may extract audio features from the new audio sample, and then feed those features into the trained machine learning model 498 at operation 560. Next, a voice improvement module 497 of the machine learning model 498 may generate the supplemental acoustic profile(s) 499b-499n at operation 565. In some embodiments, this may include receiving and adjusting original acoustic profile 499. At operations 570-575, the user may optionally be given an opportunity to hear the recording (created at operation 505) as processed by the supplemental acoustic profile 499a, and then approve or reject the updated model. If the user rejects the supplemental acoustic profile(s) 499b-499n (575:NO), the noise reduction service 496 may return to operations 505, 555 to collect and process a new sample. If the user accepts the supplemental acoustic profile(s) 499b-499n (575:YES), the system may output the model for use in future, live conferences. In some embodiments, this may include allowing the user to select which acoustic profile 499a-499n to use in that conference.

Model Training

The machine learning model 498 in some embodiments may be any software system that recognizes patterns. In some embodiments, the machine learning may comprise a plurality of artificial neurons interconnected through connection points called synapses. Each synapse may encode a strength of the connection between the output of one neuron and the input of another. The output of each neuron, in turn, may be determined by the aggregate input received from other neurons that are connected to it, and thus by the outputs of these "upstream" connected neurons and the strength of the connections as determined by the synaptic weights.

The ML models may be trained to solve a specific problem (e.g., to generate configuration settings for a customized, user-specific acoustic model) by adjusting the weights of the synapses such that a particular class of inputs produce a desired output. This weight adjustment procedure in these embodiments is known as "learning." Ideally, these adjustments lead to a pattern of synaptic weights that, during the learning process, converge toward an optimal solution for the given problem based on some cost function.

In some embodiments, the artificial neurons may be organized into layers. The layer that receives external data is the input layer. The layer that produces the ultimate result is the output layer. Some embodiments include hidden layers between the input and output layers, and commonly hundreds of such hidden layers.

Figure 6:
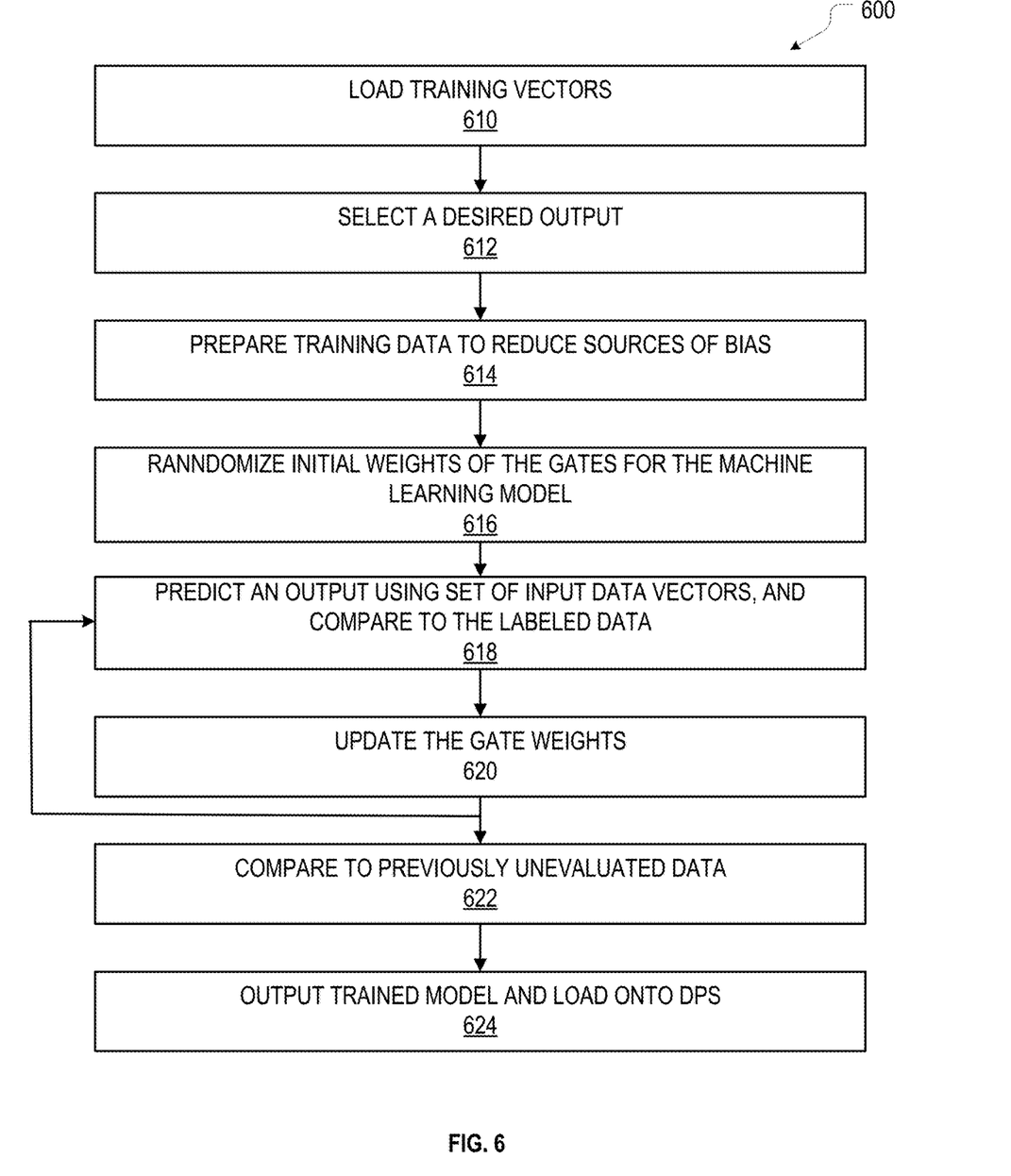
FIG. 6 is a flow chart illustrating one method of training a machine learning model, consistent with some embodiments.

FIG. 6 is a flow chart illustrating one method 600 of training the machine learning model 498, consistent with some embodiments. A system manager may begin by loading training vectors at operation 610. These vectors may include audio recording from a plurality of different users taken in quiet rooms and reading a specially prepared transcript.

At operation 612, the system manager may select a desired output (e.g., optimal settings for the acoustic model 499). At operation 614, the training data may be prepared to reduce sources of bias, typically including de-duplication, normalization, and order randomization. At operation 616, the initial weights of the gates for the machine learning model may be randomized. At operation 618, the ML model may be used to predict an output using set of input data vectors, and that prediction is compared to the labeled data. The error (e.g., the difference between the predicted value and the labeled data) is then used at operation 620 to update the gate weights. This process may repeat, with each iteration updating the weights, until the training data is exhausted, or the ML model reaches an acceptable level of accuracy and/or precision. At operation 622, the resulting model may optionally be compared to previously unevaluated data to validate and test its performance. At operation 624, the resulting model may be loaded onto a noise reduction service 496 in a cloud computing environment 50 and used to analyze user recordings.

Conference System

Figure 7:
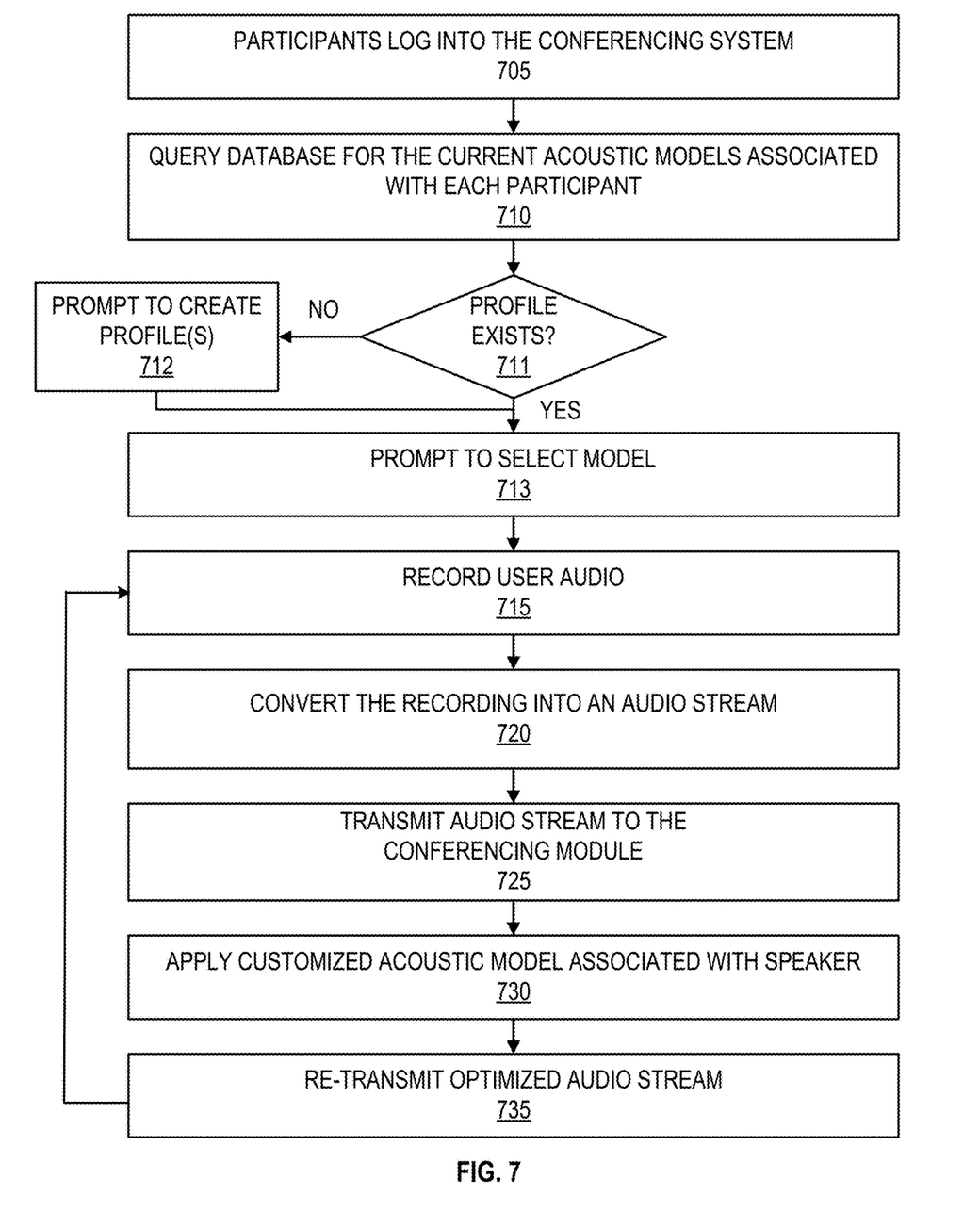
FIG. 7 is a flow chart of a conferencing system in operation, consistent with some embodiments.

FIG. 7 is a flow chart of the conferencing system 700 in operation, consistent with some embodiments. At operation 705, a plurality of participants to a conference call may register and/or login to the conferencing system 700 with, for example, a username and password. At operation 710, the conferencing system 700 will query the database 482 for the current acoustic models 499 associated with each of the participants. If no model exists for one or more of the participants (711: NO), then the system may prompt that participant or participants to record raw audio data of their speech to begin to build a speaker-specific audio model at operation 712. Optionally, the system may also give the participant(s) the option to use a universal model (i.e., a model created to isolate a wide variety of voices and languages) for this conference call at operation 712, which may be desirable if the participant does not have the time and/or equipment to create a customized model. If the participant has created multiple customized models, the system may prompt the participant to select the model to use for this call at operation 713.

One of the participants may then begin to speak. Their user device 403 may record those sounds at operation 715, convert the recording into an original audio stream at operation 720, and transmit the original audio stream the conferencing module 480 at operation 725. In response, the conferencing system 700 apply the customized acoustic model for that particular speaker (identified at operation 705) to the received audio stream to produce an optimized audio stream (e.g., one in which the user's voice is amplified and/or any background noise suppressed) at operation 730. The conferencing system 700 may then transmit the optimized audio stream to the other participants in the conference call at operation at operation 735. These embodiments may be desirable because they can be used with any user device 403, such as a "plain ordinary telephone system" handset.

Alternatively, in some embodiments, some or all of the user devices 403 may locally (e.g., by a processor in the user device 403) apply the customized acoustic model to the original audio stream, and then transmit the optimized audio stream (and not the original audio stream) to the conferencing system 700 at operation 725. The conferencing system 700 may then proceed directly to operation 735 and re-transmit the optimized audio stream to the other participants. These embodiments may be desirable because they can be used with any conferencing system 700.

Operations 715-735 may repeat each time a participant speaks during the duration of the conference call, by the conferencing system 700, by the user device 403, and/or a combination of both.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A method of using a computing device to amplify user voices, the method comprising:
generating a plurality of customized acoustic profiles for a first user of a conferencing system, wherein the generating comprises:
receiving, by a second microphone of the conferencing system, an audio sample of speech submitted by the first user for a first customized acoustic profile of the plurality of the customized acoustic profiles; and
generating, by the conferencing system, a user-specific acoustic model and a supplemental acoustic model for enhancement of speech by the first user based upon the audio sample, wherein the pre-trained acoustic model is adapted for a normal physical condition of the user and wherein the supplemental pre-trained acoustic model is adapted for a sick voice of the user;
receiving, in response to the generating the plurality of customized acoustic profiles, a live audiovisual stream from the first user at the conferencing system, the live audiovisual stream including live speech by the first user captured by a first microphone, wherein the live audiovisual stream includes background noise, and the first microphone is a non-directional microphone;
prompting, in response to the receiving the live audiovisual stream, the first user to select an acoustic profile for the live audiovisual stream;
receiving, by the conferencing system, a selection of the first customized acoustic profile, the selection input by the first user in response to the prompting;
in response to the selection of the first customized acoustic profile, applying the supplemental user-specific acoustic model by the conferencing system to selectively amplify live speech received from a user device during the live audiovisual stream without amplifying the background noise, wherein the conferencing system is configured to suppress the sick voice of the user when the pre-trained acoustic model is selected, and the amplification comprises recording the live speech and the amplification is based on the selected acoustic profile; and
retransmitting the amplified live speech of the first user to a plurality of other users of the conferencing system.

2. The method of claim 1, further comprising applying the user-specific acoustic model by the conferencing system to selectively suppress background noise in the live speech received from the user device during the live audiovisual stream.

3. The method of claim 1, further comprising generating a plurality of user-specific acoustic models, where each of the user-specific acoustic models is for one of each of the plurality of users of the conference call software.

4. The method of claim 1, further comprising:
collecting the audio sample from the first user in an environment substantially without background noise; and
using the audio sample to generate the user-specific acoustic model.

5. The method of claim 1, further comprising using a machine learning model to generate the first user-specific acoustic model, wherein the machine learning model is trained by process comprising:
obtaining a set of training data;
randomizing initial weights of gates for the machine learning model;
obtaining predictions made by the machine learning model based on the set of training data;
determining a difference between the predictions and labels from the set of training data;
updating the initial weights of the gates based on the difference.

6. The method of claim 1, wherein the generating the plurality of the customized acoustic profiles further comprises:
receiving, by the computing device, a second audio sample of speech submitted by the user for a second customized acoustic profile of the plurality of customized acoustic profiles; and
generating, by the computing device, a supplemental user-specific acoustic model for enhancement of speech by the user based on the second audio sample, wherein the supplemental user-specific acoustic model is associated with the second customized acoustic profile.

7. The method of claim 1, further comprising:
receiving, by the conferencing system, an audio stream from a second user, wherein the audio stream comprises second live speech by the second user and second background noise;
prompting the second user to select a second customized user-specific acoustic profile for the second user for the audio stream;
receiving, by the conferencing system, a selection of the second customized user-specific acoustic profile from the second user; and
in response to the receiving the selection of the second customized user-specific acoustic profile, using, by the conferencing system, the second customized user-specific acoustic model to selectively amplify the second speech of the second user in the audio stream without amplifying the second background noise.

8. The method of claim 7, wherein the first user and the second user are associated with the same respective device.

9. The method of claim 8, wherein the first user and the second user are associated with the first microphone.

10. A computer program product for selectively amplifying a user's voice using a pre-trained acoustic model, the computer program product comprising a computer readable storage medium having program instructions embodied therewith, the program instructions executable by a processor to cause the processor to:
generate a plurality of customized acoustic profiles for the user, wherein the generating comprises:
extracting voice data for the user from an existing voice sample submitted by the user from a second microphone for a first customized acoustic profile of the plurality of the customized acoustic profile; and
creating the pre-trained acoustic model and a supplemental pre-trained acoustic model for the user from the voice data, wherein the pre-trained acoustic model is associated with the first customized acoustic profile, and the pre-trained acoustic model is adapted for a normal physical condition of the user and wherein the supplemental pre-trained acoustic model is adapted for a sick voice of the user;
initiating, in response to the generating the plurality of customized acoustic profiles, a conference call between a plurality of users on a plurality of remote devices, comprising;
prompting the user to select an acoustic profile on their respective remote device, wherein the acoustic profile comprises the pre-trained acoustic model and the supplemental pre-trained acoustic model;

receiving, from the respective remote device, a selection of the first customized acoustic profile, the selection input by the user in response to the prompt;

in response to the receiving the selection, analyzing an audio stream from the respective remote device, wherein the audio stream is captured by a first microphone and the first microphone is a non-directional microphone;

detecting, based on the analyzing, a presence of background noise in the audio stream; and in response to the detecting, applying the supplemental pre-trained acoustic model of the selected acoustic profile to the audio stream to selectively amplify the user's voice and not the background noise, wherein the amplification comprises recording the live speech and the amplification is based on the selected acoustic profile, and is configured to make the users voice sound like the normal voice; and retransmitting the amplified live speech to the respective devices of the other users in the conference call.

11. The computer program product of claim 10, further comprising program instructions to use the pre-trained acoustic model to selectively suppress the background noise from the audio stream.

12. The computer program product of claim 10, wherein the pre-trained acoustic model is a plugin to conference call software and further comprising program instructions to generate a plurality of other user-specific acoustic models, where each of the other user-specific acoustic models is for one of the plurality of users of the conference call software.

13. The computer program product of claim 10, further comprising program instructions to generate a plurality of user-specific acoustic models for the user, wherein a first of the plurality of user-specific acoustic models is adapted for speech in a first language, and wherein a second of the plurality of user-specific acoustic models is adapted for speech in a second language.

14. The computer program product of claim 10, further comprising:

receiving, by a computing device, an audio sample of speech from the user from an environment substantially without background noise; and using a trained machine learning model to generate the pre-trained acoustic model from the audio sample.

15. A system for amplifying user voices, the system comprising a processor configured to execute program instructions that, when executed on the processor, cause the processor to:

generate a plurality of customized acoustic profiles for a first user of a conferencing system, wherein the generating comprises:

receiving, by a second microphone the conferencing system, an audio sample of speech submitted by the first user for a first customized acoustic profile of the plurality of the customized acoustic profiles; and generating, by the conferencing system, a user-specific acoustic model and a supplemental acoustic model for enhancement of speech by the first user based upon the audio sample, wherein the pre-trained acoustic model is adapted for a normal physical condition of the user and wherein the supplemental pre-trained acoustic model is adapted for a sick voice of the user;

receive, in response to the generating the plurality of customized acoustic profiles, a live audiovisual stream from the first user at the conferencing system, the live audiovisual stream including live speech by the first user captured by a first microphone, wherein the live audiovisual stream includes background noise, and the first microphone is a non-directional microphone;

prompt, in response to the receiving the live audiovisual stream, the first user to select an acoustic profile for the live audiovisual stream;

receive, by the conferencing system and in response to the prompt, a selection of the first customized acoustic profile, the selection input by the first user in response to the prompting;

in response to the selection of the first customized acoustic profile, applying the supplemental user-specific acoustic model by the conferencing system to selectively amplify live speech received from a user device during the live audiovisual stream without amplifying the background noise, wherein the conferencing system is configured to suppress the sick voice of the user when the pre-trained acoustic model is selected, and the amplification comprises recording the live speech and the amplification is based on the selected acoustic profile; and retransmitting the amplified live speech of the first user to a plurality of other users of the conferencing system.

16. The system of claim 15, further comprising program instructions to apply the user-specific acoustic model by the conferencing system to selectively suppress background noise in the live speech received from the user device during the live audiovisual stream.

17. The system of claim 15, wherein the user-specific acoustic model is a plugin to conference call software.

18. The system of claim 17, further comprising program instructions to generate a plurality of user-specific acoustic models, where each of the user-specific acoustic models is for one of each of the plurality of users of the conference call software.

19. The system of claim 15, further comprising program instructions to:

collect an audio sample from the first user in an environment substantially without background noise; and use the audio sample to generate the user-specific acoustic model.

* * * * *